US011880294B2

(12) United States Patent
Parikh et al.

(10) Patent No.: US 11,880,294 B2
(45) Date of Patent: Jan. 23, 2024

(54) REAL-TIME CROSS APPLIANCE OPERATIONAL INTELLIGENCE DURING MANAGEMENT APPLIANCE UPGRADE

(71) Applicant: VMWARE, INC., Palo Alto, CA (US)

(72) Inventors: Anmol Parikh, Bangalore (IN); Ivaylo Radoslavov Radev, Sofia (BG); Akash Kodenkiri, Bangalore (IN); Ammar Rizvi, Bangalore (IN); Grigor Harbaliev, Sofia (BG); Vladimir Ivanov, Sofia (BG); Dimitar Dimitrov, Sofia (BG); Chandrika Mutalik, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 96 days.

(21) Appl. No.: 17/720,340

(22) Filed: Apr. 14, 2022

(65) Prior Publication Data

US 2023/0236952 A1    Jul. 27, 2023

(30) Foreign Application Priority Data

Jan. 21, 2022  (IN) .............................. 202241003571

(51) Int. Cl.
*G06F 9/44* (2018.01)
*G06F 9/48* (2006.01)
*G06F 9/445* (2018.01)
*G06F 9/455* (2018.01)
*G06F 11/36* (2006.01)
*G06F 8/65* (2018.01)

(52) U.S. Cl.
CPC ............ *G06F 11/3636* (2013.01); *G06F 8/65* (2013.01)

(58) Field of Classification Search
CPC ... G06F 8/38; G06F 8/34; G06F 11/36; G06F 8/433; G06F 8/40; G06F 8/65; G06F 11/3632; G06F 11/3636
See application file for complete search history.

(56) References Cited

U.S. PATENT DOCUMENTS 10,466,981 B1 * 11/2019 MacMillan ......... G06F 9/45512

OTHER PUBLICATIONS

S. Prathibha, Investigating the Performance of Machine Learning Algorithms for Improving Fault Tolerance for Large Scale Workflow Applications in Cloud Computing, 4 pages (Year: 2019).*

(Continued)

*Primary Examiner* — Thuy Dao
(74) *Attorney, Agent, or Firm* — Kim & Stewart LLP

(57) ABSTRACT

Distributed tracing is applied during an upgrade from a first management appliance to a second management appliance. The distributed tracing method includes generating a parent span that encapsulates states of the overall workflow, including a span context that contains a trace identifier and a span identifier, and generating a plurality of child spans. Each child span encapsulates states that represent a piece of the workflow and contains a reference to the parent span context. The states of the child spans include an error tag that indicates whether the piece of the workflow associated with the child span executed with an error. Because child spans may be generated for a piece of the workflow that is executed by a service running in the first or second management appliance, the span context for the parent span is persisted by the first management appliance and replicated for use by the second management appliance.

20 Claims, 6 Drawing Sheets

(56) References Cited

OTHER PUBLICATIONS

GitHub, "The OpenTracing Semantic Specification," Version: 1.1, 2016, 8 pages, Retrieved from the Internet Jun. 8, 2022, URL: specification/specification.md at 1be630515dafd4d2a468d083300900f89f28e24d • opentracing/ specification • GitHub.

Velotio Technologies, "A Comprehensive Tutorial to Implementing OpenTracing With Jaeger," Velotio Perspectives, Feb. 1, 2019, 12 pages, Retrieved from the Internet Jun. 8, 2022, URL: https://medium.com/velotio-perspectives/a-comprehensive-tutorial-to-implementing-opentracing-with-jaeger-a01752e1a8ce.

* cited by examiner

REAL-TIME CROSS APPLIANCE OPERATIONAL INTELLIGENCE DURING MANAGEMENT APPLIANCE UPGRADE

RELATED APPLICATION

Benefit is claimed under 35 U.S.C. 119(a)-(d) to Foreign Application Serial No. 202241003571 filed in India entitled "REAL-TIME CROSS APPLIANCE OPERATIONAL INTELLIGENCE DURING MANAGEMENT APPLIANCE UPGRADE", on Jan. 21, 2022, by VMware, Inc., which is herein incorporated in its entirety by reference for all purposes.

BACKGROUND

In a software-defined data center (SDDC), virtual infrastructure, which includes virtual machines (VMs) and virtualized storage and networking resources, is provisioned from hardware infrastructure that includes a plurality of host computers (hereinafter also referred to simply as "hosts"), storage devices, and networking devices. The provisioning of the virtual infrastructure is carried out by management software, referred to herein as virtual infrastructure management (VIM) software, that communicates with virtualization software (e.g., hypervisor) installed in the host computers.

VIM server appliances, such as VMware vCenter® server appliance, include such VIM software and are widely used to provision SDDCs across multiple clusters of hosts, where each cluster is a group of hosts that are managed together by the VIM software to provide cluster-level functions, such as load balancing across the cluster by performing VM migration between the hosts, distributed power management, dynamic VM placement according to affinity and anti-affinity rules, and high availability (HA). The VIM software also manages a shared storage device to provision storage resources for the cluster from the shared storage device.

For customers who have multiple SDDCs deployed across different geographical regions, and deployed in a hybrid manner, e.g., on-premise, in a public cloud, or as a service, the process of upgrading VIM server appliances across many different locations has proven to be challenging because of the many requirements that need to be met. The first is minimal downtime. During the downtime, customer workloads running on the virtual infrastructure are not affected, but none of the management services provided through the VIM server, such as the cluster-level functions described above, are available. The second is the requirement to keep the VIM server appliances on the same version or different by one version at worst. The third is the ability to recover from anticipated upgrade failures within permissible service-level agreement (SLA).

In addition, customers have a limited ability to monitor the progress of the upgrades in real-time and to identify root causes of the failed upgrades. Logs could be examined for both purposes but collecting the logs generated by different services involved in the upgrade process and analyzing them is a tedious process, and impracticable for customers who need to monitor the upgrades across multiple locations.

SUMMARY

One or more embodiments employ distributed tracing to provide real-time operational intelligence during an upgrade of a management appliance, in particular during a migration-based upgrade where distributed tracing is applied across a first management appliance (one that is used prior to the upgrade) and a second management appliance (one that is used after the upgrade). The distributed tracing is applied because the migration-based upgrade workflow employs services running in both the first management appliance and the second management appliance. The data collected from the distributed tracing can be used to determine whether or not the workflow executed with an error and which piece of the workflow executed with the error.

The distributed tracing method according to one embodiment includes generating a parent span for a trace that encapsulates states of the overall workflow, including a span context that contains an identifier for the trace and an identifier for the parent span, and generating a plurality of child spans. Each of the child spans encapsulates states that represent a piece of the workflow and contains a reference to the span context of the parent span. The states of the child spans include an error tag that indicates whether or not the piece of the workflow associated with the child span executed with an error. Because child spans may be generated for a piece of the workflow that is executed by a service running in either the first management appliance or the second management appliance, the span context for the parent span is persisted in a first data store provisioned for the first management appliance and replicated in a second data store provisioned for the second management appliance. The child spans generated for pieces of the workflow executed by services running in the first management appliance reference the span context of the parent span retrieved from the first data store, and the child spans generated for pieces of the workflow executed by services running in the second management appliance reference the span context of the parent span retrieved from the second data store.

Further embodiments include a non-transitory computer-readable storage medium comprising instructions that cause a computer system to carry out the above method, as well as a computer system configured to carry out the above method.

DETAILED DESCRIPTION

One or more embodiments employ a cloud control plane for managing SDDCs, which may be of different types and which may be deployed across different geographical regions. In the embodiment illustrated herein, the upgrade of VIM server appliances of a customer, which are distributed across multiple locations, is instructed through the cloud control plane. Cloud service agents running locally in the SDDCs establish cloud inbound connections with the cloud control plane to retrieve the task to upgrade the VIM server appliances. Each cloud service agent then downloads the image of the upgraded VIM server appliance and delegates the task to upgrade the VIM server appliance to a lifecycle manager (LCM) running in the VIM server appliance.

Figure 1:
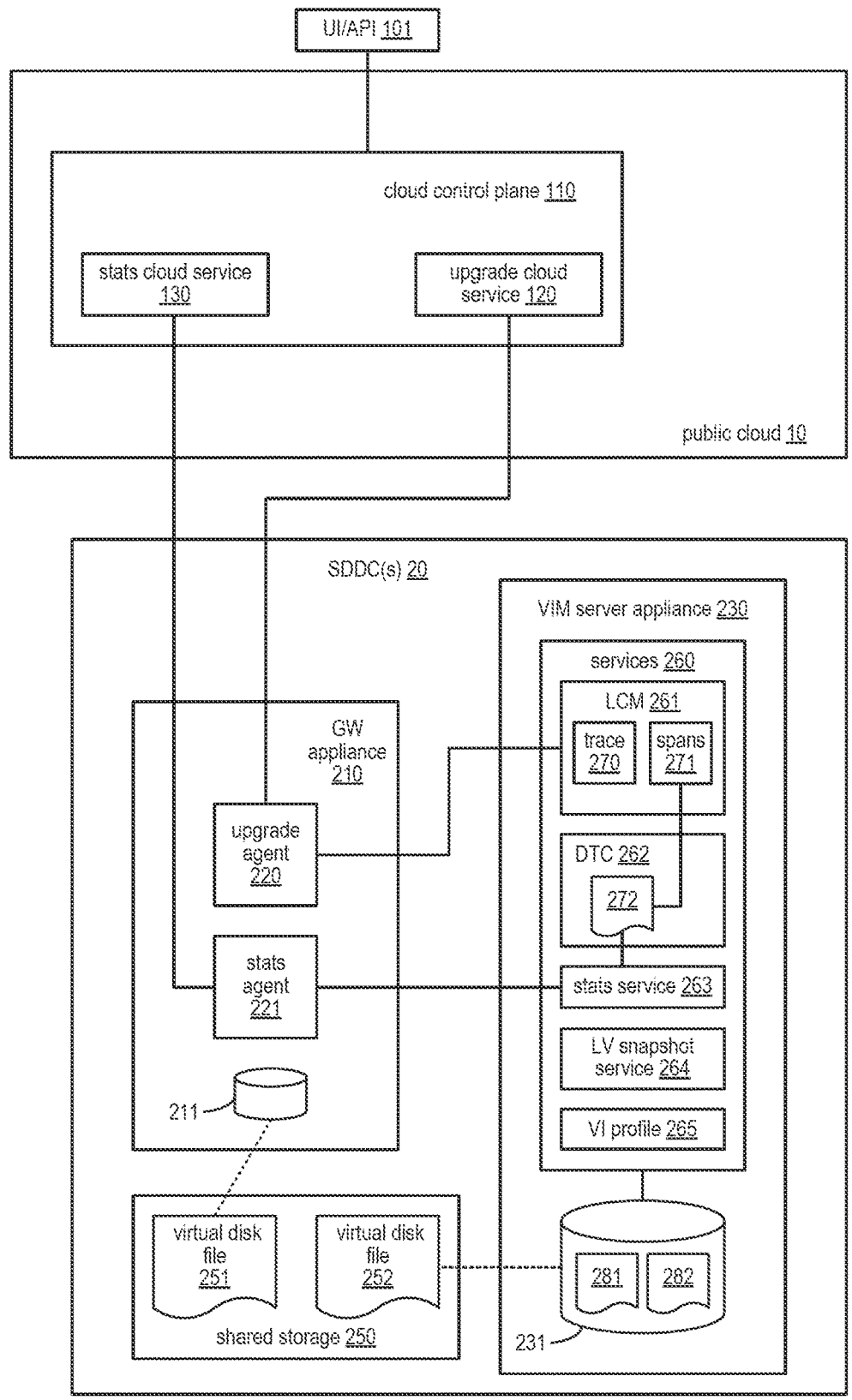
FIG. 1 depicts a cloud control plane implemented in a public cloud, and a plurality of SDDCs that are managed through the cloud control plane.

FIG. 1 depicts a cloud control plane 110 implemented in a public cloud 10, and a plurality of SDDCs that are managed through cloud control plane 110. In the embodiment illustrated herein, cloud control plane 110 is accessible by multiple tenants through UI/API 101 and each of the different tenants manage a group of SDDCs through cloud control plane 110. In the following description, a group of SDDCs of one particular tenant is depicted as SDDCs 20, and to simplify the description, the operation of cloud control plane 110 will be described with respect to management of SDDCs 20, in particular monitoring the progress of upgrades of VIM server appliance in real-time and identifying root causes of any failed upgrades. However, it should be understood that the SDDCs of other tenants have the same appliances, software products, and services running therein as SDDCs 20, and are managed through cloud control plane 110 in the same manner as described below for SDDCs 20.

A user interface (UI) or an application programming interface (API) that interacts with cloud control plane 110 is depicted in FIG. 1 as UI/API 101. Through UI/API 101, an administrator of SDDCs 20 can issue various commands to initiate the upgrade of VIM server appliances in SDDCs 20 and to trace the execution of the upgrade process that is distributed across different services.

Cloud control plane 110 represents a group of services running in virtual infrastructure of public cloud 10 that interact with each other to provide a control plane through which the administrator of SDDCs 20 can manage SDDCs 20 by issuing commands through UI/API 101. Two cloud services are depicted in FIG. 1. They are upgrade cloud service 120 through which the upgrade process for VIM server appliances in SDDCs 20 is managed, and stats cloud service 130 through which distributed tracing data are collected from SDDCs 20 and analyzed to produce a display that is presented to the administrator through UI/API 101.

As described above, a plurality of SDDCs 20, which may be of different types and which may be deployed across different geographical regions, is managed through cloud control plane 110. In one example, one of SDDCs 20 is deployed in a private data center of the customer and another one of SDDCs 20 is deployed in a public cloud, and all of SDDCs are located in different geographical regions so that they would not be subject to the same natural disasters, such as hurricanes, fires, and earthquakes.

Any of the services of described above (and below) may be a microservice that is implemented as a container image executed on the virtual infrastructure of public cloud 10. In one embodiment, each of the services described above is implemented as one or more container images running within a Kubernetes® pod.

In each SDDC 20, regardless of its type and location, a gateway appliance 210 and VIM server appliance 230 are provisioned from the virtual resources of SDDC 20. In one embodiment, gateway appliance 210 and VIM server appliance 230 are each a VM instantiated in one or more hosts of the same cluster that is managed by VIM server appliance 230. Virtual disk 211 is provisioned for gateway appliance 210 and storage blocks of virtual disk 211 map to storage blocks allocated to virtual disk file 251. Similarly, virtual disk 231 is provisioned for VIM server appliance 230 and storage blocks of virtual disk 231 map to storage blocks allocated to virtual disk file 252. Virtual disk files 251 and 252 are stored in shared storage 250. Shared storage 250 is managed by VIM server appliance 230 as storage for the cluster and may be a physical storage device, e.g., storage array, or a virtual storage area network (VSAN) device, which is provisioned from physical storage devices of the hosts in the cluster.

Gateway appliance 210 functions as a communication bridge between cloud control plane 110 and VIM server appliance 230. In particular, upgrade agent 220 running in gateway appliance 210 communicates with upgrade cloud service 120 to retrieve the task to upgrade the VIM server appliance when the upgrade command is issued through UI/API 101 and delegates the task to a lifecycle manager (LCM) 261, which is running in VIM server appliance 230 as one of services 260. After the upgrade task has completed, upgrade agent 220 sends back the execution result to upgrade cloud service 120. In addition, stats agent 221 collects distributed tracing data and other data from stats service 263 running in VIM server appliance 230 and transmits the distributed tracing data and other data that were collected to stats cloud service 130, which analyzes the data to produce a display that is presented to the administrator through UI/API 101.

Distributed trace collector 262 is responsible for collecting the distributed tracing data and passing them onto stats service 263. The distributed tracing data is generated when LCM 261 calls a trace function 270 during the upgrade process to generate spans (depicted as spans 271 in FIG. 1). In one embodiment, trace function 270 is made available for calls by instrumenting LCM 261 with a set of distributed tracing APIs known in the art as OpenTracing APIs. As will be further described below, each span represent a piece of the workflow that is being traced and encapsulates the following states: operation name, start timestamp, finish timestamp, a set of zero or more span tags, a set of zero or more span logs, and a span context. A span may have a parent span and in such as case, the span, which is referred to herein as a child span, contains a reference to the span context for the parent span. In the embodiments, the states of all the spans, including any reference to a parent span context, are saved in span file 272, which resides in a directory managed by distributed trace collector 262. In addition, the span context of the span that is generated at the beginning of the upgrade process is persisted on disk by storing it in virtual disk 231 as parent span context file 282.

Other services 260 running in VIM server appliance 230 include and logical volume (LV) snapshot service 264, and VI profile service 265. LV snapshot service 264 is responsible for generating snapshots of logical volumes, which have logical extents mapped to physical extents of virtual disk 231, and is used in the method of upgrading VIM server appliance 230 as described below. VI profile service 265 is responsible for applying the desired configuration of the virtual infrastructure managed by VIM server appliance 230 (e.g., the number of clusters, the hosts that each cluster would manage, etc.) and the desired configuration of various features provided by other VIM services running in VIM server appliance 230 (e.g., distributed resource scheduling (DRS), high availability (HA), and workload control plane). Configuration and database files 281 for services 260 running in VIM server appliance 230 are stored in virtual disk 231.

Figure 2:
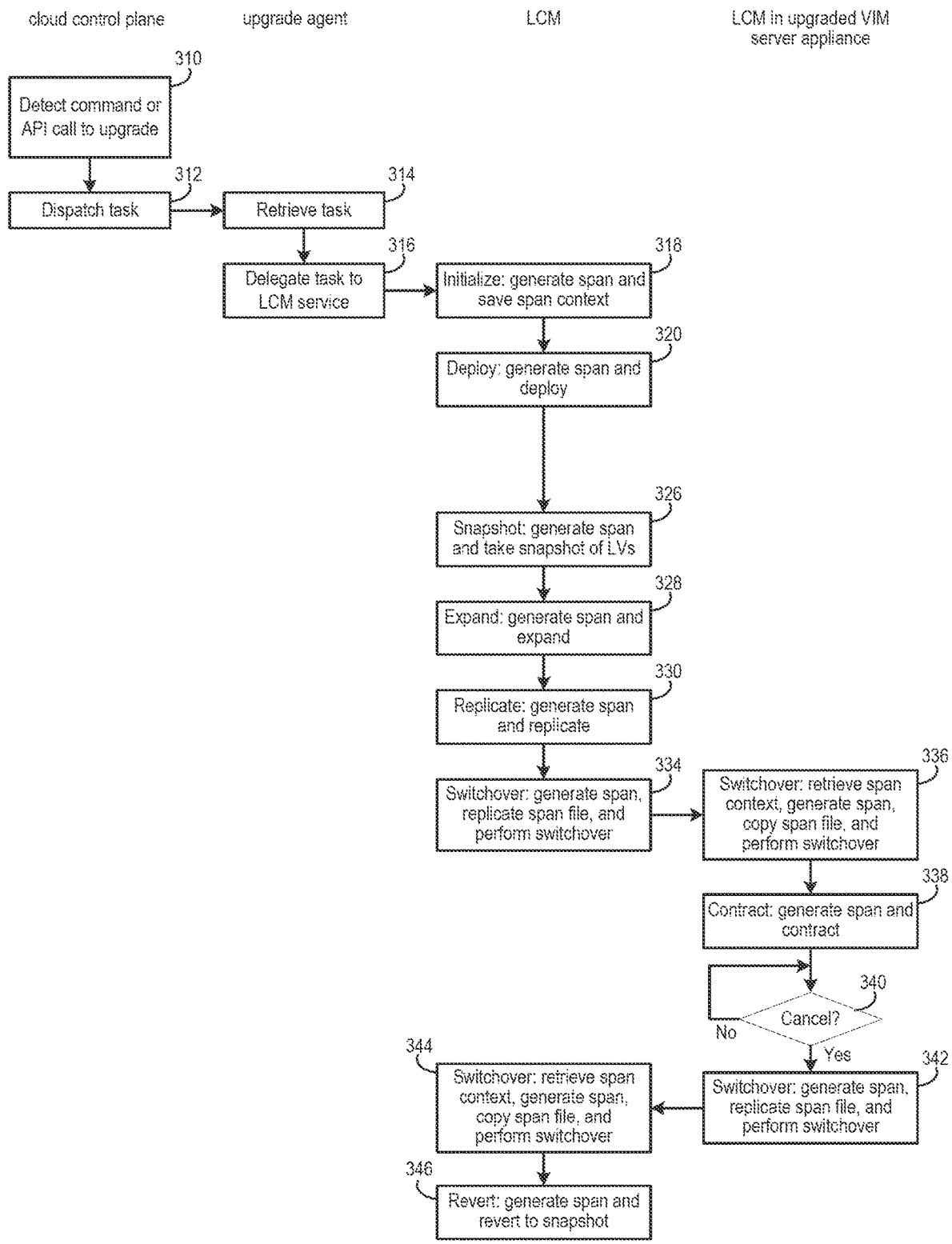
FIG. 2 is a flow diagram that depicts the steps of a process of upgrading a VIM server appliance and generating spans during the upgrade process according to embodiments.

FIG. 2 is a flow diagram that depicts the steps of a process of upgrading a VIM server appliance and generating spans during the upgrade process according to embodiments. The process begins at step 310 when cloud control plane 110 detects a command or an API call to upgrade the VIM server appliance to a new image. Upon receipt of this command or API call, cloud control plane 110 at step 312 dispatches the task. Then, upgrade agent 220 at step 314 retrieves the task to upgrade from cloud control plane 110, and at step 316 delegates the task to LCM service 261.

The subsequent steps depicted in FIG. 2 represent the upgrade workflow that is being traced according to embodiments. The upgrade workflow has several pieces executed by LCM 261 and several pieces executed by the LCM in the upgraded VIM server appliance. The beginning of the upgrade workflow is the initialize phase (step 318). As part of this phase, LCM 261 calls trace function 270 to generate a parent span for the entire upgrade workflow. As noted above, the generated parent span encapsulates the following states: operation name, start timestamp, finish timestamp, a set of zero or more span tags, a set of zero or more span logs, and a span context. Span tags are key-value pairs that enable user-defined annotation of spans in order to query, filter, and comprehend trace data. Span tags for the parent span include an error tag which is set to "True" if the upgrade workflow executes with an error and set to "False" if the upgrade workflow executes with no error. Span logs are key-value pairs that are useful for capturing span-specific logging messages and other debugging or informational output during execution of the workflow. Span logs are paired with a timestamp and may be useful for documenting a specific moment or event within the span. In the embodiments illustrated herein, there are no span logs for the parent span. The span context for the parent span contains a trace ID, which uniquely identifies this trace of the upgrade workflow from all other workflows being traced, and a span ID, which uniquely identifies this span from all other spans under this trace ID. When the call to trace function 270 returns, LCM 261 persists the span context for the parent span by saving it in a parent span context file 282 stored in virtual disk 231 and replicated on another virtual disk so that child spans can reference the span context for the parent span even if the child spans are generated by calls executed in a different appliance.

At step 320, which represents the deploy phase, LCM 261 calls trace function 270 to generate a child span for this piece of the upgrade workflow. The generated child span encapsulates the following states: operation name, start timestamp, finish timestamp, a set of zero or more span tags, a set of zero or more span logs, and a span context. Span tags for this child span include an error tag which is set to "True" if this piece of the upgrade workflow executes with an error and set to "False" if this piece of the upgrade workflow executes with no error, and an error.type tag which contains an error ID. Span logs for this child span includes an "error.what" log which contains an error message and is paired with a timestamp. The span context for this child span includes the trace ID of its parent span, and a span ID, which uniquely identifies this span from all other spans under this trace ID. This child span also contains a reference to the span context of the parent span.

During the deploy phase, LCM 261 selects a host on which the upgraded VIM server appliance is to be deployed and deploys the upgraded VIM server appliance on the selected host. The upgraded VIM server appliance is depicted as VIM server appliance 230$u$ in FIGS. 3A-3C, and provides upgraded services 260$u$, including upgraded LCM 261$u$, distributed trace collector 262$u$, and stats service 263$u$. Virtual disk 231$u$ is provisioned for VIM server appliance 230$u$ and storage blocks of virtual disk 231$u$ map to storage blocks allocated to virtual disk file 253.

During the next phase, which is the snapshot phase (step 326), LCM 261 calls trace function 270 to generate a child span for this piece of the upgrade workflow. Then, LCM 261 requests LV snapshot service 262 to take a snapshot of the logical volumes of VIM server appliance 230. The snapshot is taken to preserve the state of the logical volumes before configuration and database files 281 are changed to make them compatible with the upgraded VIM server appliance. If the upgrade process fails at any point after the changes have been made, LCM 261 can abort the upgrade process and instruct LV snapshot service 262 to revert back to the snapshot.

The next phase of the upgrade process is the expand phase (step 328). In the embodiments, expand and contract approach is used on configuration and database files 281 to evolve their state to make them forward compatible while keeping them backward compatible. This approach reduces the downtime of VIM server appliance 230 during the upgrade process. At step 328, LCM 261 calls trace function 270 to generate a child span for this piece of the upgrade workflow and expands configuration and database files 281 to make them forward compatible with the upgraded VIM server appliance.

Figure 3A:
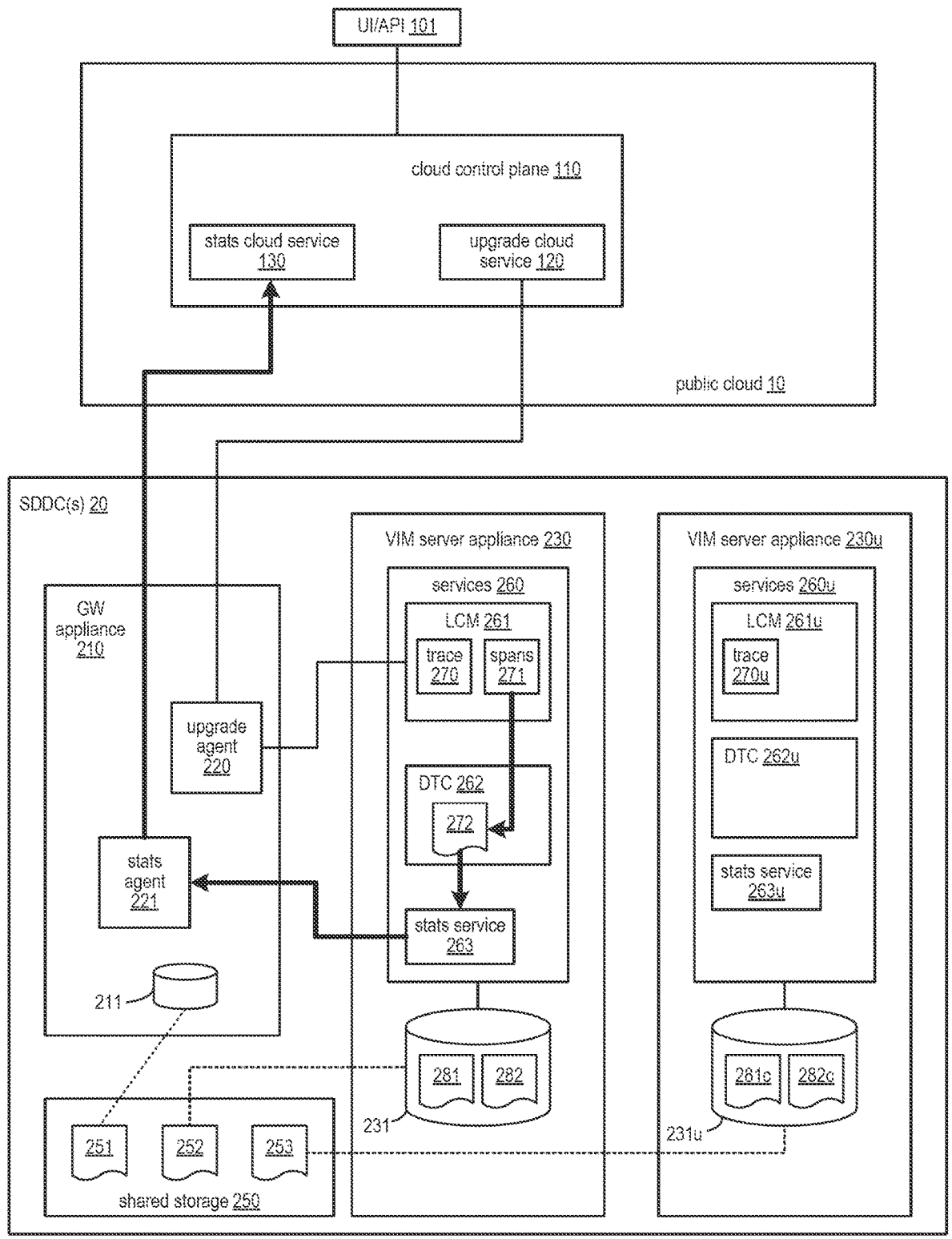
FIG. 3A is a diagram that illustrates a data flow path of distributed tracing data prior to the switchover to an upgraded VIM server appliance.
Figure 3B:
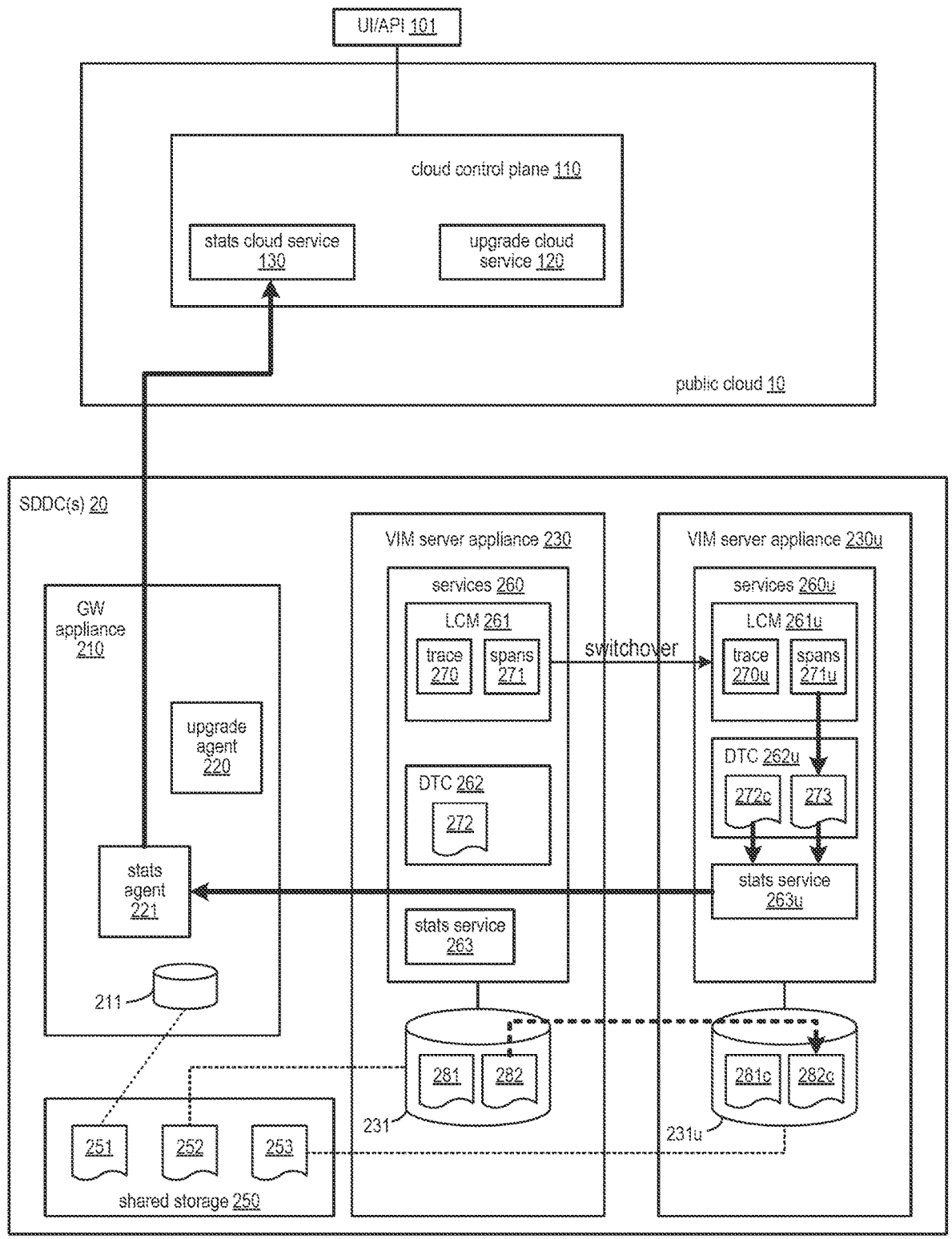
FIG. 3B is a diagram that illustrates the data flow path of the distributed tracing data after the switchover to the upgraded VIM server appliance.
Figure 3C:
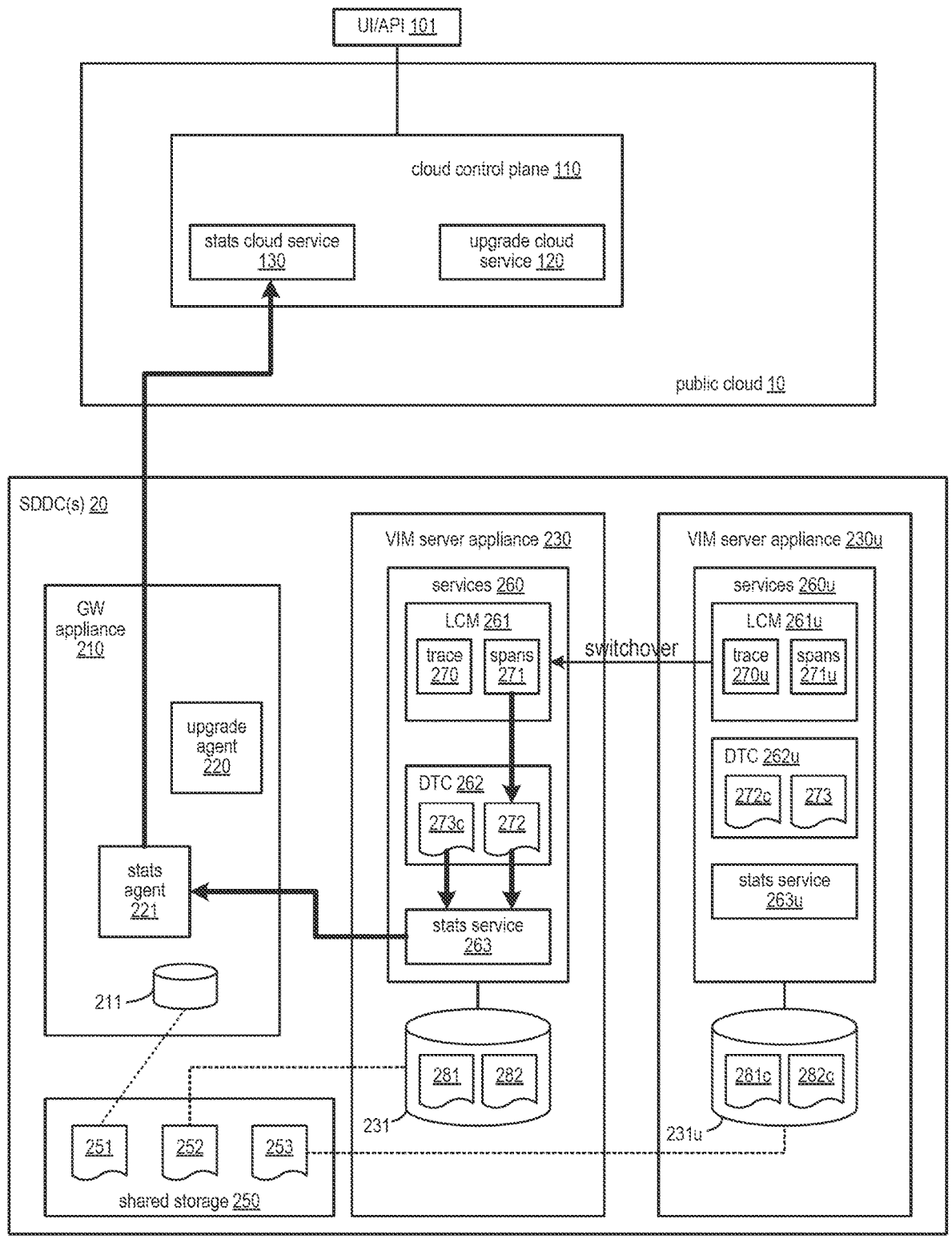
FIG. 3C is a diagram that illustrates the data flow path of the distributed tracing data after cancellation of the switchover to the upgraded VIM server appliance.

The next step in the upgrade process is the replication step 330. At step 330, LCM 261 calls trace function 270 to generate a child span for this piece of the upgrade workflow and instructs LCM 261$u$ to replicate the logical volumes of VIM server appliance 230. As a result, data blocks allocated to virtual disk file 252 are copied into data blocks allocated to virtual disk file 253, and logical volumes of VIM server appliance 230$u$ are mapped to locations of virtual disk 231$u$ corresponding to the data blocks of virtual disk file 253 containing the copied contents. Because the copied contents include those of configuration and database files 281 and parent span context file 282, at the conclusion of copying, a copy thereof, depicted as configuration and database files 281$c$ and parent span context file 282$c$ in FIGS. 3A-3C, is stored in virtual disk 231$u$. As a result of the replication of parent context file 282, child spans for pieces of the upgrade workflow that are executed in VIM server appliance 230$u$ that reference this parent span context can be generated in VIM server appliance 230$u$ by calling trace function 270$u$.

After replication, switchover is executed in two parts. The first part of the switchover is step 334 executed by LCM 261 and the second part of the switchover is step 336 executed by LCM 261$u$. At step 334, LCM 261 calls trace function 270 to generate a child span for this piece of the upgrade workflow and then communicates with LCM 261$u$ to replicate span file 272, so that distributed tracing data collected by stats service 263$u$ (after the switchover) and sent to stats cloud service 130 through stats agent 221 will contain child spans generated for pieces of the upgrade workflow executed in both VIM server appliance 230 and VIM server appliance 230$u$. At step 336, LCM 261$u$ retrieves the span context of the parent span from parent span context file 282$c$ and calls trace function 270$u$ to generate a child span for this piece of the upgrade workflow. LCM 261$u$ at step 336 also instructs distributed trace collector 262$u$ to copy contents of span file 272 into a file in a directory managed thereby (depicted as span file 272$c$ in FIG. 3B). To perform the switchover, LCM 261 stops the VIM services provided by VIM server appliance 230 and then LCM 261$u$ starts the VIM services provided by VIM server appliance 230$u$. In addition, the network identity of VIM server appliance 230 is transferred from VIM server appliance 230 to VIM server appliance 230u so that requests for VIM services will come into VIM server appliance 230u.

Step 338 represents the contract phase. At step 338, LCM 261u calls trace function 270u to generate a child span for this piece of the upgrade workflow, and contracts configuration and database files 281c to remove any portions of configuration and database files 281c that were needed by VIM server appliance 230 but no longer needed by VIM server appliance 230u.

If an upgrade error is detected at any time after the snapshot is taken and before the switchover, LCM 261 can abort the upgrade process and instruct LV snapshot service 262 to revert back to the snapshot. If an upgrade error is detected after the switchover, the switchover may be cancelled (step 340). If the switchover is cancelled, LCM 261u and LCM 261 perform a second switchover. The second switchover is also executed in two parts, the first part of which is step 342 executed by LCM 261u and the second part of which is step 344 executed by LCM 261. If an upgrade error is detected during the deploy stage, the upgrade process is aborted.

At step 342, LCM 261u calls trace function 270u to generate a child span for this piece of the upgrade workflow and then communicates with LCM 261 to replicate span file 273 (which is a file in the directory managed by distributed trace collector 262u into which child spans generated for pieces of the workflow executed in VIM server appliance 230u are collected), so that distributed tracing data collected by stats service 263 (after the second switchover) and sent to stats cloud service 130 through stats agent 221 will contain child spans generated for pieces of the upgrade workflow executed in both VIM server appliance 230 and VIM server appliance 230u. At step 344, LCM 261 retrieves the span context of the parent span from parent span context file 282 and calls trace function 270 to generate a child span for this piece of the upgrade workflow. LCM 261 at step 344 also instructs distributed trace collector 262 to copy contents of span file 273 into a file in the directory managed thereby (depicted as span file 273c in FIG. 3C). To perform the second switchover, LCM 261u stops the VIM services provided by VIM server appliance 230u and then LCM 261 starts the VIM services provided by VIM server appliance 230. In addition, the network identity of VIM server appliance 230u is transferred from VIM server appliance 230u to VIM server appliance 230 so that requests for VIM services will come into VIM server appliance 230.

The next phase after the second switchover is the revert-to-snapshot phase (step 346). At step 346, LCM 261 calls trace function 270 to generate a child span for this piece of the upgrade workflow and instructs LV snapshot service 262 to revert to the snapshot that was taken at step 326.

FIG. 3A is a diagram that illustrates a data flow path of distributed tracing data prior to the switchover to an upgraded VIM server appliance. As depicted in bold lines, spans 271 that encapsulate states, which contain distributed tracing data for pieces of the workflow executed in VIM server appliance 230 prior to the switchover, are collected into span file 272 that resides in a directory managed by distributed trace collector 262. Stats service 263 periodically polls distributed trace collector 262 for updates to span file 272 and sends span file 272 containing the updates to stats agent 221, which transmits the distributed tracing data to stats cloud service 130.

FIG. 3B is a diagram that illustrates the data flow path of the distributed tracing data after the switchover to the upgraded VIM server appliance. As depicted in bold lines, spans 271u that encapsulate states, which contain distributed tracing data for pieces of the workflow executed in VIM server appliance 230u after the switchover, are collected into span file 273 that resides in a directory managed by distributed trace collector 262u. Stats service 263u periodically polls distributed trace collector 262u for updates to span file 273 and sends span file 273 containing the updates and span file 272c that was replicated from span file 272 that contains spans generated for pieces of the workflow executed in VIM server appliance 230 prior to the switchover to stats agent 221, which transmits the distributed tracing data to stats cloud service 130.

FIG. 3C is a diagram that illustrates the data flow path of the distributed tracing data after cancellation of the switchover to the upgraded VIM server appliance. As depicted in bold lines, spans 271 that encapsulate states, which contain distributed tracing data for pieces of the workflow executed in VIM server appliance 230, are collected into span file 272. Stats service 263 periodically polls distributed trace collector 262 for updates to span file 272 and sends span file 272 containing the updates and span file 273c that was replicated from span file 273 that contains spans generated for pieces of the workflow executed in VIM server appliance 230u prior to the cancellation of the switchover to stats agent 221, which transmits the distributed tracing data to stats cloud service 130.

Figure 4:
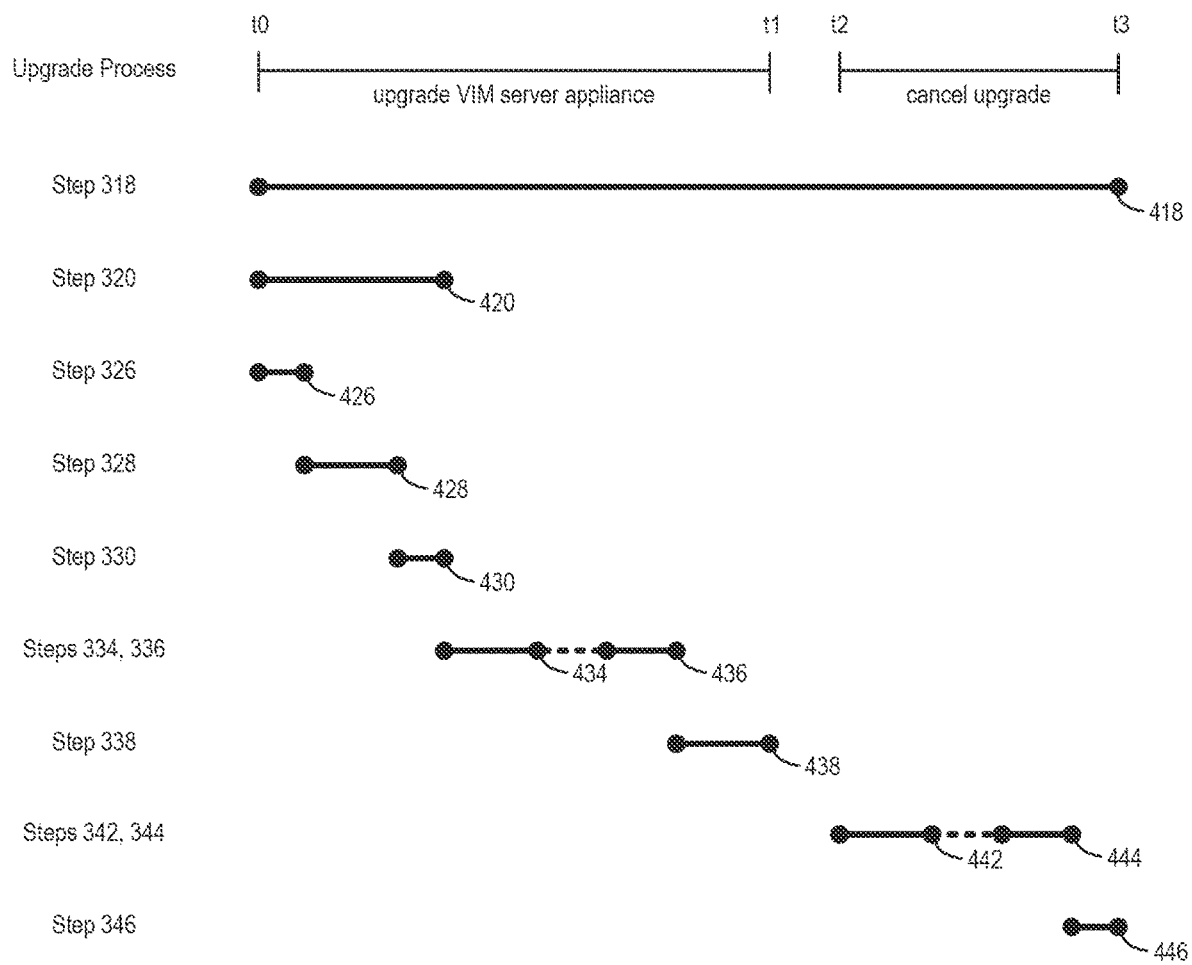
FIG. 4 illustrates a sample display of the spans that are generated alongside corresponding steps of the process of upgrading the VIM server appliance.

FIG. 4 illustrates a sample display of the spans that are generated alongside corresponding steps of the process of upgrading the VIM server appliance. In one embodiment, this display is provided through UI/API 101 after stats cloud service 130 analyzes the distributed tracing data transmitted thereto by stats agent 221. The spans include spans 418, 420, 426, 428, 430, 434, 436, 438, 442, 444, 446, and they are displayed underneath a time axis that extends from t0 (representing the start of the upgrade workflow) and t3 (representing the end of the upgrade workflow). The time period between t0 and t1 represents the time period during which the VIM server appliance is upgrade from VIM server appliance 260 to VIM server appliance 260u. The time period between t1 and t2 represents a time period for determining whether the upgrade executed with errors. The time period between t2 and t3 represents a time period during which the upgrade is cancelled.

Span 418 is the parent span for the entire upgrade workflow. Span 418 is displayed according to the start timestamp of the parent span and the finish timestamp of the parent span. In the example, the start timestamp of the parent span is t0 and the finish timestamp of the parent span is t3. All other spans are child spans of this parent span and each of these other spans are also displayed according to its start timestamp and its finish timestamp.

Span 420 is a child span for the piece of the workflow corresponding to the deploy phase (step 320). Span 426 is a child span for the piece of the workflow corresponding to the snapshot phase (step 326). Because steps 320 and 326 can be carried out in parallel, it is assumed that the two steps are carried out in parallel and so the start timestamp of these two spans are the same.

Span 428 is a child span for the piece of the workflow corresponding to the expand phase (step 328) which is executed after the snapshot phase. Therefore, span 428 is displayed with a time period that is subsequent to the time period for span 426.

Span 430 is a child span for the piece of the workflow corresponding to the replicate phase (step 330) which is executed after the expand phase. Therefore, span 430 is displayed with a time period that is subsequent to the time period for span 428.

The spans generated for the two switchover steps 334, 336 are displayed as span 434 and span 436 separated by a time period that represents the blind spot during the switchover. Span 434 is for the switchover step 334 which is executed after the replicate phase. Therefore, span 434 is displayed with a time period that is subsequent to the time period for span 430. Similarly, because switchover step 336 is executed after the switchover step 334, span 436 is displayed with a time period that is subsequent to the time period for span 434.

Span 438 is a child span for the piece of the workflow corresponding to the contract phase (step 338) which is executed after the switchover step 336. Therefore, span 438 is displayed with a time period that is subsequent to the time period for span 436.

Spans 442, 444, 446 correspond to pieces of the upgrade workflow that are executed if the upgrade is cancelled. The spans generated for the two switchover steps 342, 344 are displayed as span 442 and span 444 separated by a time period that represents the blind spot during the switchover. Span 442 is for the switchover step 342 which is executed upon cancellation. Therefore, span 442 is displayed with a time period that starts at t2. Also, because switchover step 344 is executed after the switchover step 342, span 444 is displayed with a time period that is subsequent to the time period for span 442.

Span 446 is a child span for the piece of the workflow corresponding to the revert-to-snapshot phase (step 346) which is executed after the switchover step 344. Therefore, span 446 is displayed with a time period that is subsequent to the time period for span 444.

The embodiments described above provide the following benefits and advantages:

Real-time cross appliance operational intelligence is provided during the management server upgrade.

Real-time monitoring and visualization of the management server upgrade as it progresses from one phase to another.

Correlation of events across appliances, i.e., all the events on the source management appliance (pre-upgrade management appliance) and the target management appliance (post-upgrade management appliance) get correlated together to generate a single trace for each upgrade.

The events during management server upgrade can be visualized together on the analytics platform along with important metrics like time duration of each phase.

Errors and warning, if any, during the management server upgrade can be easily pinpointed to the correct sub-phase with the corresponding error message.

Every upgrade is a unique operation and assigned a unique trace ID. This ensures that analytics provide complete picture of every attempt to upgrade and all previous failures to upgrade.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of tracing execution of a workflow that employs services running in a first management appliance and a second management appliance to determine whether or not the workflow executed with an error and which piece of the workflow executed with the error, said method comprising:
generating a parent span that encapsulates first states that represent the workflow, wherein one of the first states is a span context that includes a trace identifier and a span identifier;
storing the span context of the parent span in a first data store provisioned for the first management appliance;
replicating the span context of the parent span in a second data store provisioned for the second management appliance;
generating a plurality of first child spans, each encapsulating second states that represent a piece of the workflow executed by one of the services running in the first management appliance and containing a reference to the span context of the parent span that is retrieved from the first data store, wherein the second states include an error tag that indicates whether or not the piece of the workflow executed with an error; and
generating a plurality of second child spans, each encapsulating third states that represent a piece of the workflow executed by one of the services running in the second management appliance and containing a reference to the span context of the parent span that is retrieved from the second data store, wherein the third states include an error tag that indicates whether or not the piece of the workflow executed with an error.

2. The method of claim 1, wherein
the first states each include a first timestamp representing a start time of the workflow and a second timestamp representing an end time of the workflow; and
the second and third states each include a first timestamp representing a start time of a corresponding piece of the workflow and a second timestamp representing an end time of the corresponding piece of the workflow.

3. The method of claim 1, wherein
the workflow is an upgrade process to upgrade the first management appliance to the second management appliance, and the parent span is generated during an initialization phase of the upgrade process.

4. The method of claim 3, wherein
the upgrade process includes a switchover phase during which a network identify of the first management appliance is transferred from the first management appliance to the second management appliance, and
one of the first child spans and one of the second child spans are generated during the switchover phase.

5. The method of claim 4, further comprising:
prior to transferring the network identify of the first management appliance from the first management appliance to the second management appliance, collecting the parent span and the first child spans into corresponding first span files managed by a first distributed tracing service running in the first management appliance, and transmitting the first span files to an agent of a distributed tracing service hosted in a cloud.

6. The method of claim 5, further comprising:
during the switchover phase, prior to transferring the network identify of the first management appliance from the first management appliance to the second management appliance, replicating the first span files in the second management appliance to be managed by a second distributed tracing service running in the second management appliance.

7. The method of claim 6, further comprising:
after transferring the network identify of the first management appliance from the first management appliance to the second management appliance, collecting the second child spans into corresponding second span files managed by the second distributed tracing service running in the second management appliance, and transmitting both the replicated first span files and the second span files to the agent of the distributed tracing service hosted in the cloud.

8. The method of claim 7, wherein
the upgrade process includes an upgrade cancel phase during which a network identify of the second management appliance is transferred from the second management appliance to the first management appliance, and
one of the second child spans and one of the first child spans are generated during the upgrade cancel phase.

9. The method of claim 8, further comprising:
during the upgrade cancel phase, prior to transferring the network identify of the second management appliance is transferred from the second management appliance to the first management appliance, replicating the second span files in the first management appliance to be managed by the first distributed tracing service running in the first management appliance.

10. A tracing system that traces execution of a workflow that employs services running in a first management appliance and a second management appliance to determine whether or not the workflow executed with an error and which piece of the workflow executed with the error, the tracing system comprising:
a first host in which the first management appliance is deployed, the services of the first management appliance including a first lifecycle manager and a first distributed tracing collector; and
a second host in which the second management appliance is deployed, the services of the second management appliance including a second lifecycle manager and a second distributed tracing collector,
wherein the first lifecycle manager is programmed to:
generate a parent span that encapsulates first states that represent the workflow, wherein one of the first states is a span context that includes a trace identifier and a span identifier,
store the span context of the parent span in a first data store provisioned for the first management appliance,
communicate with the second lifecycle manager to replicate the span context of the parent span in a second data store provisioned for the second management appliance, and
generate a plurality of first child spans, each encapsulating second states that represent a piece of the workflow executed by one of the services running in the first management appliance and containing a reference to the span context of the parent span that is retrieved from the first data store, wherein the second states include an error tag that indicates whether or not the piece of the workflow executed with an error, and wherein the second lifecycle manager is programmed to:
generate a plurality of second child spans, each encapsulating third states that represent a piece of the workflow executed by one of the services running in the second management appliance and containing a reference to the span context of the parent span that is retrieved from the second data store, wherein the third states include an error tag that indicates whether or not the piece of the workflow executed with an error.

11. The tracing system of claim 10, wherein
the first states each include a first timestamp representing a start time of the workflow and a second timestamp representing an end time of the workflow; and
the second and third states each include a first timestamp representing a start time of a corresponding piece of the workflow and a second timestamp representing an end time of the corresponding piece of the workflow.

12. The tracing system of claim 10, wherein
the workflow is an upgrade process to upgrade the first management appliance to the second management appliance, and the parent span is generated during an initialization phase of the upgrade process.

13. The tracing system of claim 12, wherein
the upgrade process includes a switchover phase during which a network identify of the first management appliance is transferred from the first management appliance to the second management appliance, and
one of the first child spans and one of the second child spans are generated during the switchover phase.

14. The tracing system of claim 13, wherein
prior to transferring the network identify of the first management appliance from the first management appliance to the second management appliance, the parent span and the first child spans are collected into corresponding first span files managed by the first distributed tracing service, and the first distributed tracing service transmits the first span files to an agent of a distributed tracing service hosted in a cloud.

15. The tracing system of claim 14, wherein
during the switchover phase, prior to transferring the network identify of the first management appliance from the first management appliance to the second management appliance, the first span files are replicated in the second management appliance to be managed by the second distributed tracing service.

16. The tracing system of claim 15, wherein
after transferring the network identify of the first management appliance from the first management appliance to the second management appliance, the second child spans are collected into corresponding second span files managed by the second distributed tracing service, and the second distributed tracing service transmits both the replicated first span files and the second span files to the agent of the distributed tracing service hosted in the cloud.

17. The tracing system of claim 16, wherein
the upgrade process includes an upgrade cancel phase during which a network identify of the second management appliance is transferred from the second management appliance to the first management appliance, and
one of the second child spans and one of the first child spans are generated during the upgrade cancel phase.

18. The tracing system of claim 17, wherein
during the upgrade cancel phase, prior to transferring the network identify of the second management appliance is transferred from the second management appliance to the first management appliance, the second span files are replicated in the first management appliance to be managed by the first distributed tracing service and the first distributed tracing service transmits both the first span files and the replicated second span files to the agent of the distributed tracing service hosted in the cloud.

19. A non-transitory computer-readable medium comprising instructions that are executable on a first processor of a first management appliance and a second processor of a second management appliance to carry out a method of tracing execution of a workflow that employs services running in the first management appliance and the second management appliance to determine whether or not the workflow executed with an error and which piece of the workflow executed with the error, said method comprising:
generating a parent span that encapsulates first states that represent the workflow, wherein one of the first states is a span context that includes a trace identifier and a span identifier;
storing the span context of the parent span in a first data store provisioned for the first management appliance;
replicating the span context of the parent span in a second data store provisioned for the second management appliance;
generating a plurality of first child spans, each encapsulating second states that represent a piece of the workflow executed by one of the services running in the first management appliance and containing a reference to the span context of the parent span that is retrieved from the first data store, wherein the second states include an error tag that indicates whether or not the piece of the workflow executed with an error; and
generating a plurality of second child spans, each encapsulating third states that represent a piece of the workflow executed by one of the services running in the second management appliance and containing a reference to the span context of the parent span that is retrieved from the second data store, wherein the third states include an error tag that indicates whether or not the piece of the workflow executed with an error.

20. The non-transitory computer-readable medium of claim 19, wherein
the first states each include a first timestamp representing a start time of the workflow and a second timestamp representing an end time of the workflow; and
the second and third states each include a first timestamp representing a start time of a corresponding piece of the workflow and a second timestamp representing an end time of the corresponding piece of the workflow.

* * * * *